United States Patent

Getker et al.

[15] 3,692,980
[45] Sept. 19, 1972

[54] COUNTER FOR VARIABLE SIZE AND SHAPE OBJECTS

[72] Inventors: James A. Getker, Kettering; Horace W. Weeks, Bellbrook, both of Ohio

[73] Assignee: The National Cash Register Company, Dayton, Ohio

[22] Filed: Feb. 25, 1971

[21] Appl. No.: 118,817

[52] U.S. Cl. .........235/92 PK, 235/92 R, 235/92 SH, 235/92 PC, 235/92 V, 235/98 C
[51] Int. Cl. ..............................................G06m 7/00
[58] Field of Search.235/92 V, 92 SB, 92 PC, 92 PK, 235/92 TC, 98

[56] References Cited

UNITED STATES PATENTS

| | | | |
|---|---|---|---|
| 3,408,485 | 10/1968 | Scott | 235/92 PK |
| 3,349,227 | 10/1967 | Martens | 235/92 V |
| 3,024,985 | 3/1962 | Heil | 235/92 SB |
| 3,088,036 | 4/1963 | Hobbs | 235/92 V |

*Primary Examiner*—Maynard R. Wilbur
*Assistant Examiner*—Robert F. Gnuse
*Attorney*—Louis A. Kline, Albert L. Sessler and Elmer Wargo

[57] ABSTRACT

A counter for counting objects (like parcels) passing over a conveyor belt. A plurality of belt-type conveyors is used to spread the parcels and to deliver them to a sampling line which includes a plurality of photoelectric cells over which the parcels are moved by a conveyor belt. As the parcels pass over the cells, light directed at the cells is blocked by the parcels to provide a sampling pattern of blocked and unblocked cells. Logic circuits successively compare each periodic sampling pattern with prior sampling pattern according to a predetermined set of logic equations so as to detect the "lead edges" of the parcels and their "trail edges" as they pass over the sampling line. Each periodic sampling pattern is loaded into a Present Shift Register, from which it is transferred to a Past Shift Register to become the "prior sampling pattern", which is compared with the "current" sampling pattern present in the Present Shift Register. Counters are used to count the "Lead Edge Events" and the "Trail Edge Events" defined by the logic equations, and the larger of the two counts (if the counts are not equal) is selected as the more accurate count of the parcels on the conveyor. A parcel may cross the sampling line at any position thereon to be counted, and parcels in contacting juxtaposition may also be counted.

5 Claims, 9 Drawing Figures

FIG. 2 TYPICAL PARCEL ORIENTATION FOR LEAD EDGE AND TRAIL EDGE EVENTS

FIG. 3

LOGIC CONDITION FOR LEAD EDGE EVENTS

| EVENT | PRESENT SHIFT REGISTER | | | | | | | PAST SHIFT REGISTER | | | | | | |
|---|---|---|---|---|---|---|---|---|---|---|---|---|---|---|
| | PR31 | PR32 | PR33 | PR34 | PR35 | PR36 | PA1 | PA31 | PA32 | PA33 | PA34 | PA35 | PA36 | PA37 |
| LEA | X | X | X | 0 | 1 | 1 | 0 | X X X X X | X X X X X | X X X X X | 0 1 1 0 0 0 | 0 0 0 1 0 0 | 0 0 0 0 1 0 | 0 0 0 0 0 1 |
| LEB | X | X | 0 | 1 | 1 | 1 | 0 | X X X X X X | X X X X X X | 0 1 0 0 0 0 | 0 0 1 0 0 0 | 0 0 0 1 0 0 | 0 0 0 0 1 0 | 0 0 0 0 0 1 |
| LEC | X | 0 | 1 | 1 | 1 | 1 | 0 | X X X X X X | 0 1 0 0 0 0 | 0 0 1 0 0 0 | 0 0 0 1 0 0 | 0 0 0 0 1 0 | 0 0 0 0 0 1 | 0 0 0 0 0 0 1 |
| LED** | X | X | 1 | 1 | 1 | 1 | 0 | X | X | 0 | 0 | 0 | 0 | 0 |
| LEE** | X | 0 | 1 | 1 | 1 | 1 | X | X | 0 | 0 | 0 | 0 | 0 | X |
| LEF | 0 | 1 | 1 | 1 | 1 | 1 | 0 | 0 1 0 0 0 0 0 0 | 0 0 1 0 0 0 0 0 | 0 0 0 1 0 0 0 0 | 0 0 0 0 1 0 0 0 | 0 0 0 0 0 1 0 0 | 0 0 0 0 0 0 1 0 | 0 0 0 0 0 0 0 1 |
| LEG** | X | 1 | 1 | 1 | 1 | 1 | X | X | 0 | 0 | 0 | 0 | 0 | X |

** LED, LEE, AND LEG ARE INHIBITED BY ANY LEAD EDGE EVENT DETECTED DURING THE PRECEDING CYCLE, BY THE ESE FLAG, AND BY ANY OTHER CONFLICTING LEAD EDGE EVENT.

FIG. 4

LOGIC CONDITIONS FOR TRAIL EDGE EVENTS

| EVENT | PAST SHIFT REGISTER | | | | | | | PRESENT SHIFT REGISTER | | | | | | |
|-------|------|------|------|------|------|------|------|------|------|------|------|------|------|-----|
|       | PA31 | PA32 | PA33 | PA34 | PA35 | PA36 | PA37 | PR31 | PR32 | PR33 | PR34 | PR35 | PR36 | PA1 |
| TEA   | X    | X    | X    | O    | 1    | 1    | O    | X X X X X | X X X X X | X X X X X | O 1 O O O | O O 1 O O | O O O 1 O | O O O O 1 |
| TEB   | X    | X    | O    | 1    | 1    | 1    | O    | X X X X X X | X X X X X X | O 1 O O O O | O O 1 O O O | O O O 1 O O | O O O O 1 O | O O O O O 1 |
| TEC   | X    | O    | 1    | 1    | 1    | 1    | O    | X X X X X X X | O 1 O O O O O | O O 1 O O O O | O O O 1 O O O | O O O O 1 O O | O O O O O 1 O | O O O O O O 1 |
| TED   | O    | 1    | 1    | 1    | 1    | 1    | O    | O 1 O O O O O O | O O 1 O O O O O | O O O 1 O O O O | O O O O 1 O O O | O O O O O 1 O O | O O O O O O 1 O | O O O O O O O 1 |
| TEE*  | 1    | 1    | 1    | 1    | 1    | 1    | X    | O    | O    | O    | O    | O    | O    | X   |

\* THE TEE EVENT IS INHIBITED BY THE ESC FLAG. AFTER DETECTION OF A TEE EVENT, ALL TRAIL EDGE EVENTS ARE INHIBITED DURING THE NEXT CYCLE.

LOGIC EQUATIONS FOR LEAD EDGE EVENTS — FIG. 5

$LEA = SPL \cdot \overline{PR34} \cdot PR35 \cdot PR36 \cdot (SPLI + \overline{PAI}) \cdot [(PA34 + SPL35) \cdot \overline{PA35} \cdot \overline{PA36} \cdot (SPLI + \overline{PA37}) + (\overline{PA34} + SPL35) \cdot \overline{PA35} \cdot PA36 \cdot (SPLI + \overline{PA37}) + (\overline{PA34} + SPL35) \cdot PA35 \cdot \overline{PA36} \cdot (SPLI + \overline{PA37}) + (PA34 + SPL35) \cdot \overline{PA35} \cdot \overline{PA36} \cdot (SPLI + \overline{PA37}) + (\overline{PA34} + SPL35) \cdot \overline{PA35} \cdot \overline{PA36} \cdot (SPLI + \overline{PA37})].$ $LEB = SPL \cdot (SPLI + \overline{PAI}) \cdot PR36 \cdot PR35 \cdot PR34 \cdot \overline{PR33} \cdot [(PA33 + SPL34) \cdot \overline{PA34} \cdot \overline{PA35} \cdot \overline{PA36} \cdot (SPLI + \overline{PA37}) + (SPL34 + \overline{PA33}) \cdot PA34 \cdot \overline{PA35} \cdot \overline{PA36} \cdot (SPLI + \overline{PA37}) + (\overline{PA34} \cdot PA35 \cdot \overline{PA36} \cdot (SPLI + \overline{PA37}) \cdot (SPL34 + \overline{PA33}) + (SPL34 + \overline{PA33}) \cdot \overline{PA34} \cdot \overline{PA35} \cdot PA36 \cdot (SPLI + \overline{PA37}) + (SPL34 + \overline{PA33}) \cdot \overline{PA34} \cdot PA35 \cdot \overline{PA36} \cdot (SPLI + PA37) + (SPL34 + PA33) \cdot \overline{PA34} \cdot \overline{PA35} \cdot PA36 \cdot (SPLI + \overline{PA37})].$ $LEC = SPL \cdot (SPLI + \overline{PAI}) \cdot \overline{PR32} \cdot PR33 \cdot PR34 \cdot PR35 \cdot PR36 \cdot [(\overline{PA32} + SPL33) \cdot \overline{PA33} \cdot \overline{PA34} \cdot \overline{PA35} \cdot \overline{PA36} \cdot (SPLI + PA37) + (SPL33 + \overline{PA32}) \cdot PA33 \cdot \overline{PA34} \cdot \overline{PA35} \cdot \overline{PA36} \cdot (SPLI \cdot \overline{PA37}) + (SPL33 + \overline{PA32}) \cdot \overline{PA33} \cdot PA34 \cdot \overline{PA35} \cdot PA36 \cdot (SPLI + \overline{PA37}) + (SPL33 + \overline{PA32}) \cdot \overline{PA33} \cdot \overline{PA34} \cdot PA35 \cdot \overline{PA36} \cdot (SPLI + \overline{PA37}) + (SPL33 + \overline{PA32}) \cdot \overline{PA33} \cdot \overline{PA34} \cdot \overline{PA35} \cdot PA36 \cdot (SPLI + \overline{PA37}) + (SPL33 + \overline{PA32}) \cdot \overline{PA33} \cdot \overline{PA34} \cdot \overline{PA35} \cdot \overline{PA36} \cdot (SPLI + \overline{PA37}) + (SPL33 + PA32) \cdot \overline{PA33} \cdot \overline{PA34} \cdot \overline{PA35} \cdot \overline{PA36} \cdot (SPLI + \overline{PA37})].$ $LED = \underline{SPL} \cdot (SPL34 + \overline{PA33}) \cdot \overline{LEC} \cdot \overline{ILE} \cdot ESE \cdot PR36 \cdot PR35 \cdot PR34 \cdot PR33 \cdot \overline{PA36} \cdot \overline{PA35} \cdot \overline{PA34} \cdot (SPLI + \overline{PAI}) \cdot (SPLI + \overline{PA37})$ $LEE = SPL \cdot (SPL33 + \overline{PA32}) \cdot \overline{LEC} \cdot \overline{ILE} \cdot ESE \cdot PR36 \cdot PR35 \cdot PR34 \cdot PR33 \cdot \overline{PA36} \cdot \overline{PA35} \cdot \overline{PA34} \cdot \overline{PA33} \cdot \overline{PA32}$ $LEF = SPL \cdot (SPLI + \overline{PAI}) \cdot PR36 \cdot PR35 \cdot PR34 \cdot PR33 \cdot PR32 \cdot \overline{PR31} \cdot [(SPL32 + PA31) \cdot \overline{PA32} \cdot \overline{PA33} \cdot \overline{PA34} \cdot \overline{PA35} \cdot \overline{PA36} \cdot (SPLI + \overline{PA37}) + (SPL32 + \overline{PA31}) \cdot PA32 \cdot \overline{PA33} \cdot \overline{PA34} \cdot \overline{PA35} \cdot \overline{PA36} \cdot (SPLI + \overline{PA37}) + (SPL32 + \overline{PA31}) \cdot \overline{PA32} \cdot PA33 \cdot \overline{PA34} \cdot \overline{PA35} \cdot \overline{PA36} \cdot (SPLI + \overline{PA37}) + (SPL32 + \overline{PA31}) \cdot \overline{PA32} \cdot \overline{PA33} \cdot PA34 \cdot \overline{PA35} \cdot \overline{PA36} \cdot (SPLI + \overline{PA37}) + (SPL32 + \overline{PA31}) \cdot \overline{PA32} \cdot \overline{PA33} \cdot \overline{PA34} \cdot PA35 \cdot \overline{PA36} \cdot (SPLI + \overline{PA37}) + (SPL32 + \overline{PA31}) \cdot \overline{PA32} \cdot \overline{PA33} \cdot \overline{PA34} \cdot \overline{PA35} \cdot PA36 \cdot (SPLI + \overline{PA37}) + (SPL32 + \overline{PA31}) \cdot \overline{PA32} \cdot \overline{PA33} \cdot \overline{PA34} \cdot \overline{PA35} \cdot \overline{PA36} \cdot (SPLI + \overline{PA37}) + (SPL32 + \overline{PA31}) \cdot \overline{PA32} \cdot \overline{PA33} \cdot \overline{PA34} \cdot \overline{PA35} \cdot PA36 \cdot (SPLI + \overline{PA37})].$ $LEG = \overline{LEF} \cdot \overline{ILE} \cdot ESE \cdot PR36 \cdot PR35 \cdot PR34 \cdot PR33 \cdot PR32 \cdot \overline{PA36} \cdot \overline{PA35} \cdot \overline{PA34} \cdot \overline{PA33} \cdot SPL \cdot \overline{PA32}.$

INVENTORS
JAMES A. GETKER &
HORACE W. WEEKS

BY

THEIR ATTORNEYS

LOGIC EQUATIONS FOR TRAIL EDGE EVENTS    FIG. 6

$TEA = \overline{ITE} \cdot (SPLI + \overline{PA37}) \cdot PA36 \cdot PA35 \cdot (SPL35 + \overline{PA34}) \cdot SPL \cdot [PR34 \cdot \overline{PR35} \cdot \overline{PR36} \cdot (SPLI + \overline{PAI}) + \overline{PR34} \cdot PR35 \cdot \overline{PR36} \cdot (SPLI + \overline{PAI}) + \overline{PR34} \cdot \overline{PR35} \cdot PR36 \cdot (SPLI + \overline{PAI}) + \overline{PR34} \cdot \overline{PR35} \cdot \overline{PR36} \cdot (SPLI + PAI) + PR34 \cdot PR35 \cdot PR36 \cdot (SPLI + PAI)].$ $TEB = SPL \cdot \overline{ITE} \cdot (SPLI + \overline{PA37}) \cdot PA36 \cdot PA35 \cdot PA34 \cdot (SPL34 + \overline{PA33}) \cdot [PR33 \cdot \overline{PR34} \cdot \overline{PR35} \cdot \overline{PR36} \cdot (SPLI + \overline{PAI}) + \overline{PR33} \cdot PR34 \cdot \overline{PR35} \cdot \overline{PR36} \cdot (SPLI + \overline{PAI}) + \overline{PR33} \cdot \overline{PR34} \cdot PR35 \cdot \overline{PR36} \cdot (SPLI \cdot \overline{PAI}) + \overline{PR33} \cdot \overline{PR34} \cdot \overline{PR35} \cdot PR36 \cdot (SPLI + \overline{PAI}) + \overline{PR33} \cdot \overline{PR34} \cdot \overline{PR35} \cdot \overline{PR36} \cdot (SPLI + PAI) + PR33 \cdot PR34 \cdot \overline{PR35} \cdot \overline{PR36} \cdot (SPLI + PAI)].$ $TEC = SPL \cdot \overline{ITE} \cdot (SPLI + \overline{PA37}) \cdot PA36 \cdot PA35 \cdot PA34 \cdot PA33 \cdot (SPL33 + \overline{PA32}) \cdot [PR32 \cdot \overline{PR33} \cdot \overline{PR34} \cdot \overline{PR35} \cdot \overline{PR36} \cdot (SPLI + \overline{PAI}) + \overline{PR32} \cdot PR33 \cdot \overline{PR34} \cdot \overline{PR35} \cdot \overline{PR36} \cdot (SPLI + \overline{PAI}) + \overline{PR32} \cdot \overline{PR33} \cdot PR34 \cdot \overline{PR35} \cdot \overline{PR36} \cdot (SPLI + \overline{PAI}) + \overline{PR32} \cdot \overline{PR33} \cdot \overline{PR34} \cdot PR35 \cdot \overline{PR36} \cdot (SPLI + \overline{PAI}) + \overline{PR32} \cdot \overline{PR33} \cdot \overline{PR34} \cdot \overline{PR35} \cdot PR36 \cdot (SPLI + \overline{PAI}) + \overline{PR32} \cdot \overline{PR33} \cdot \overline{PR34} \cdot \overline{PR35} \cdot \overline{PR36} \cdot (SPLI + PAI) + \overline{PR32} \cdot \overline{PR33} \cdot \overline{PR34} \cdot \overline{PR35} \cdot \overline{PR36} \cdot (SPLI + \overline{PAI})].$ $TED = SPL \cdot \overline{ITE} \cdot (SPLI + \overline{PA37}) \cdot PA36 \cdot PA35 \cdot PA34 \cdot PA33 \cdot PA32 \cdot (SPL32 + \overline{PA31}) \cdot [PR31 \cdot \overline{PR32} \cdot \overline{PR33} \cdot \overline{PR34} \cdot \overline{PR35} \cdot \overline{PR36} \cdot (SPLI + \overline{PAI}) + \overline{PR31} \cdot PR32 \cdot \overline{PR33} \cdot \overline{PR34} \cdot \overline{PR35} \cdot \overline{PR36} \cdot (SPLI + \overline{PAI}) + \overline{PR31} \cdot \overline{PR32} \cdot PR33 \cdot \overline{PR34} \cdot \overline{PR35} \cdot \overline{PR36} \cdot (SPLI + \overline{PAI}) + \overline{PR31} \cdot \overline{PR32} \cdot \overline{PR33} \cdot PR34 \cdot \overline{PR35} \cdot \overline{PR36} \cdot (SPLI + \overline{PAI}) + \overline{PR31} \cdot \overline{PR32} \cdot \overline{PR33} \cdot \overline{PR34} \cdot PR35 \cdot \overline{PR36} \cdot (SPLI + \overline{PAI}) + \overline{PR31} \cdot \overline{PR32} \cdot \overline{PR33} \cdot \overline{PR34} \cdot \overline{PR35} \cdot PR36 \cdot (SPLI + \overline{PAI}) + \overline{PR31} \cdot \overline{PR32} \cdot \overline{PR33} \cdot \overline{PR34} \cdot \overline{PR35} \cdot \overline{PR36} \cdot (SPLI + PAI) + \overline{PR31} \cdot \overline{PR32} \cdot \overline{PR33} \cdot \overline{PR34} \cdot \overline{PR35} \cdot \overline{PR36} \cdot (SPLI + \overline{PAI})]$ $TEE = SPL \cdot \overline{ITE} \cdot ESC \cdot \overline{TED} \cdot PA36 \cdot PA35 \cdot PA34 \cdot PA33 \cdot PA32 \cdot PA31 \cdot \overline{PR36} \cdot \overline{PR35} \cdot \overline{PR34} \cdot \overline{PR33} \cdot \overline{PR32} \cdot \overline{PR31}.$

INVENTORS
JAMES A. GETKER &
HORACE W. WEEKS

BY *Louis A. Kline*
*Albert L. Sessler*
*Elmer Wargo*
THEIR ATTORNEYS

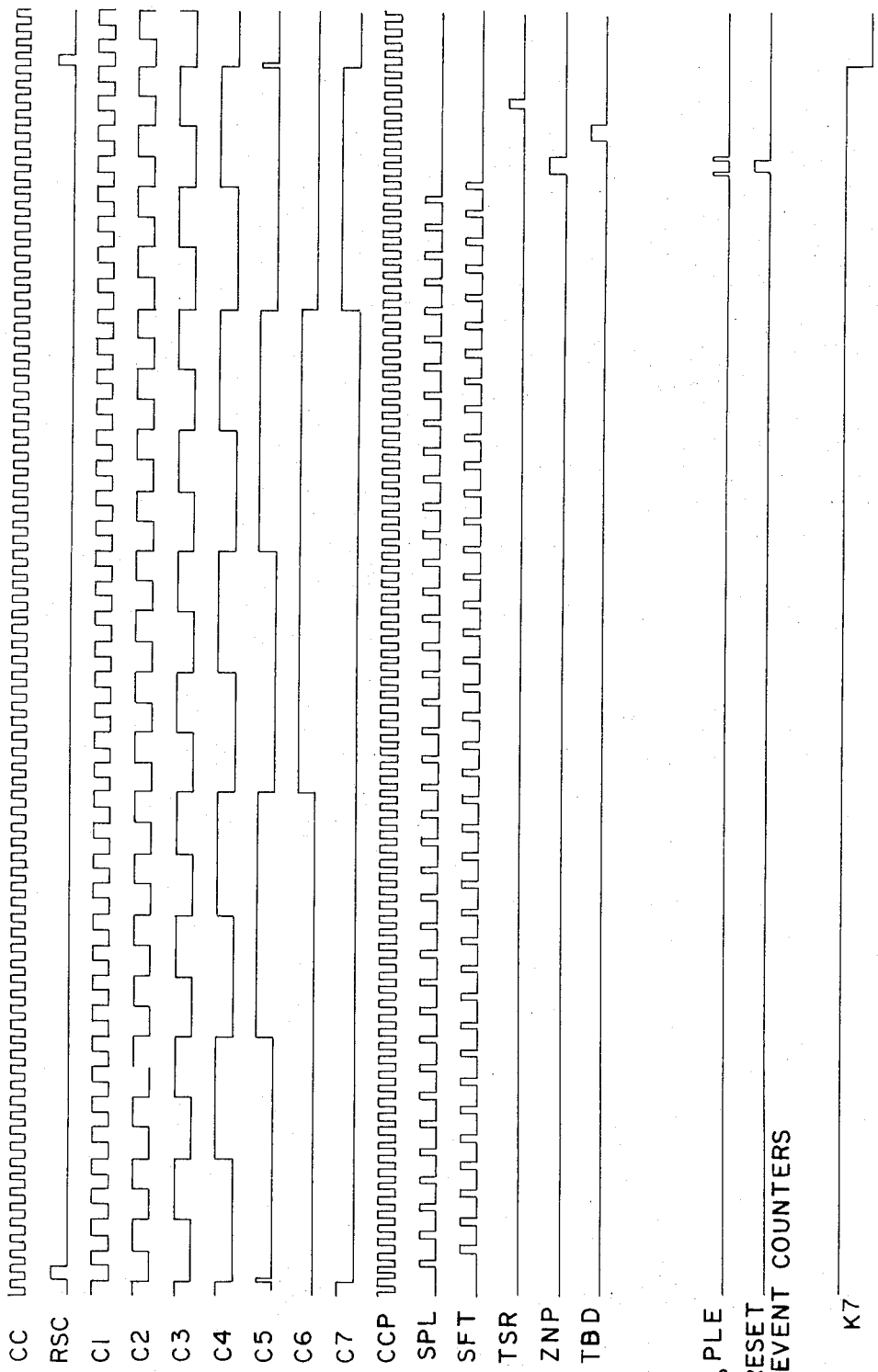

COUNTER FOR VARIABLE SIZE AND SHAPE OBJECTS

This invention was developed under a contract with the United States Government.

BACKGROUND OF THE INVENTION

This invention relates to a counter for counting objects (like parcels) of variable size and shape passing over a conveyor and is especially useful for counting parcels in a post office.

The present invention provides a useful management tool for determining the volume of work (like parcels) passing through a particular handling unit like a post office. The output of the counter of the present invention may be fed to a central control unit which monitors the performance of individual handling units with the aim of evaluating their performance and determining manpower requirements.

Parcel counters which operate by having the parcel interrupt the light to a photoelectric cell to register a count are old in the prior art; however, these counters have certain disadvantages. They always require that the parcels be singulated to form a single-file procession past a photoelectric cell, and they cannot handle parcels which are in contacting juxtaposition with one another as they pass the photoelectric cell.

With the present invention, objects (like parcels) may be in contacting juxtaposition as they pass a sampling line which includes a plurality of photoelectric cells. In addition, the objects may be positioned at any location along the sampling line while being "scanned".

SUMMARY OF THE INVENTION

This invention relates to a counter for counting objects (like parcels) of variable size and shape as they pass over a conveyor belt. The objects are dumped one on top of another on an input conveyor, and a plurality of conveyors is used to generally spread the objects into a single layer and to deliver them to a sampling line which includes a plurality of photoelectric cells over which the objects are moved by the conveyors. As the objects are moved over the photoelectric cells, light directed at the cells is blocked by the objects to provide a sampling pattern of blocked and unblocked cells. Logic circuit means successively compare each periodic or "present sampling pattern" with a "prior sampling pattern" so as to detect "lead edges" and "trail edges" in conformance with a set of predetermined logic equations. Each periodic sampling pattern is loaded into a Present Shift Register means, from which it is transferred to a Past Shift Register means to become the "prior sampling pattern", which is compared with the current or "present sampling pattern" in the "Present Shift Register". Counter means are used to count the "Lead Edge and Trail Edge Events" defined by the logic equations, and the larger of the two counts, if the counts are not equal, is selected as the more accurate count of the parcels on the conveyor belt. The Trail Edge count primarily provides a check on the Lead Edge count. A parcel may cross the sampling line at any position thereon to be counted, and parcels in contacting juxtaposition may also be counted.

BRIEF DESCRIPTION OF THE DRAWINGS

FIG. 3 is a chart showing a plurality of logic conditions defining the various Lead Edge Events shown in FIG. 2.

FIG. 4 is a chart showing a plurality of logic conditions defining the various Trail Edge events shown in FIG. 2.

FIG. 5 is a chart showing a plurality of logic equations defining the Lead Edge Events corresponding to Lead Edge orientations shown in FIG. 2.

FIG. 6 is a chart showing a plurality of logic equations defining the Trail Edge Events corresponding to the Trail Edge orientations shown in FIG. 2.

FIG. 9 is a timing chart for the circuit means shown in FIG. 8.

DETAILED DESCRIPTION OF THE INVENTION

The present invention for counting objects of varying sizes and shapes may be illustrated by showing how it can be used to count parcels in a post office.

Figure 1:
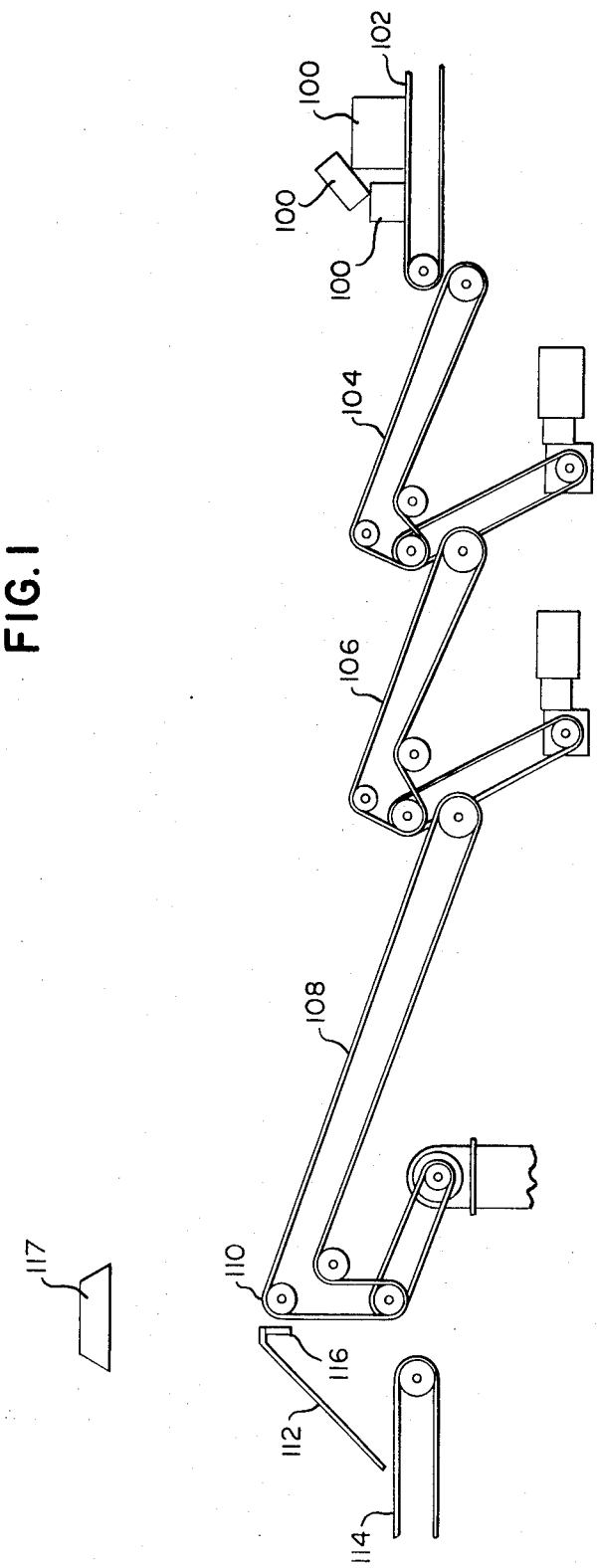
FIG. 1 is a side view, in elevation, of the conveyor means used for generally spreading the objects or parcels to be counted into a single layer and for delivering them to a sampling line where a plurality of photocells is located.

The objects (like parcels 100) are deposited one on top of another in a random manner on an endless-belt, input conveyor 102 (FIG. 1), which travels at a fixed speed. The parcels 100 are then successively transferred to a plurality of conventional, endless-belt, conveyor means which are used to generally spread them into a single layer of parcels. From the endless-belt conveyor 102, the parcels are discharged onto an endless-belt conveyor 104, which is inclined upwardly, so that the parcels may be deposited at the conveyor's discharge end onto another endless-belt conveyor 106 similar to the conveyor 104. From the conveyor 106, the parcels are discharged onto another endless-belt conveyor 108. The conveyors 104, 106, and 108 are conventionally, independently driven at successively higher surface speeds, so that, by the time the parcels reach the discharge end 110 of the conveyor 108, they are generally separated into a single layer of parcels. A feature of this invention is that, even though the parcels are not thoroughly singulated, and some lie in contacting juxtaposition, they are counted. From the discharge end 110 of the conveyor 108 (FIG. 1), the parcels pass over a slot in a slide 112, from which they are transferred to an output conveyor 114, which carries the parcels away at a surface speed equivalent to that of the input conveyor 102.

A plurality of photocells 116 (shown only as a rectangle in FIG. 1) is located at the slot in the slide 112 to provide a sampling line for the parcels 100 passing over the photocells 116. A D. C. fluorescent light 117 is positioned above the photocells 116 to illuminate them. When a "lead edge" of a parcel passes over the photocells 116, the light to the photocells is suddenly blocked, causing a sudden contraction of light therein. When the "trail edge" of a parcel passes over the photocells, there is a sudden unblocking, or an expansion, of light therein. The sudden blocking of light to the cells is considered a binary "1", while the sudden unblocking of light thereto is considered a binary "0". The condition of the photocells (whether a "1" or a "0" as defined) is periodically sampled by logic circuitry (to be described later) and interpreted to be a Lead Edge Event or a Trail Edge Event. There are 36 photocells 116 positioned along the sampling line, which is positioned perpendicularly to the motion of the conveyor 108. Each photocell 116 has its own conventional amplifier and is individually mounted along the sampling line to facilitate the replacement thereof when necessary.

The particular design parameters of the conveyor means (FIG. 1) and the photocells 116 is dependent upon the particular objects to be handled and counted by this invention. When this invention was applied to the handling of parcels in a post office, the results of a study relating to parcel size indicated that more than 98 percent of all the parcels sampled were within the following limits: height - 16 inches; width - 20 inches; length - 32 inches; and weight - 40 pounds or less. Accordingly, the width of the conveyors 104, 106, and 108 was made 36 inches, and 36 photocells 116 (placed 1 inch on centers) were positioned at the sampling line. The surface speeds of the conveyors 104, 106, and 108 operate at successively higher constant speeds, so that the terminal velocity of parcels 100 passing over the sampling line was 48 inches per second. The photocells 116 were sampled every 15 milliseconds to provide a sampling pattern for approximately each 0.75 inch of travel of the conveyor 108. The conveyors 104, 106, and 108 were inclined at an angle of about 20° (as measured from a horizontal line), and the drop (in distance) from the conveyors 104 and 106 to the next conveyor in line was about 1 foot. Limiting the inclination of the conveyors to no more than 20° enabled small cubes (about 3 inches on an edge) to be moved thereon without tumbling. The 1-foot drop between the conveyors 104 and 106 and the conveyors 106 and 108 enabled a large parcel riding on another parcel to be separated.

The general technique used for counting the parcels 100 passing over the photocells 116 (FIG. 1) is as follows. Under the most favorable conditions, a parcel passing over the photocells 116 would be aligned with its lead edge parallel to the sampling line, or line of photocells. Just prior to the lead edge of a parcel reaching the sampling line, a sampling of the photocells 116 would indicate no parcel, or a "0" condition, as previously defined. By the next sampling, the conveyor 108 would have moved the lead edge of the parcel over the sampling line, so that those photocells covered by the parcel would indicate a "1" condition. A "Lead Edge Event" under these conditions would be defined as a change from a "0" to a "1" in some of the photocells. As the parcel continued over the sampling line (assuming a rectangular parcel), there would be no change in the status of those photocells 116 which were covered. As the trail edge of the parcel passes over the sampling line, those photocells 116 which were covered by the parcel would experience an expansion of light therein and change to a "0" condition. A "Trail Edge Event" under these conditions would be defined as a change from a "1" to a "0" in those photocells which were covered. The Lead Edge Events so defined would be counted to give a measure of the parcels passing over the sampling line. Similarly, the Trail Edge Events so defined would be counted to give a measure of the parcels passing over the sampling line. While the counting of the Trail Edge Events appears to be a duplication, it provides a "check" on the count of parcels determined by the counting of the Lead Edge Events. As would be apparent, such a perfect alignment of parcels passing over the sampling line, one at a time, is not realized in actual practice. Consequently, it was necessary to develop techniques to handle the varied parcel orientations encountered when the parcels pass over the sampling line.

In examining parcel flow past the sampling line of photocells 116 (FIG. 1), most parcels appear to be oriented with a corner of the parcel going over the sampling line first. Many of the parcels were also in contacting juxtaposition as they passed over the sampling line. Accordingly, logic equations had to be developed to interpret the various parcel orientations as Lead Edge or Trail Edge Events.

Figure 2:
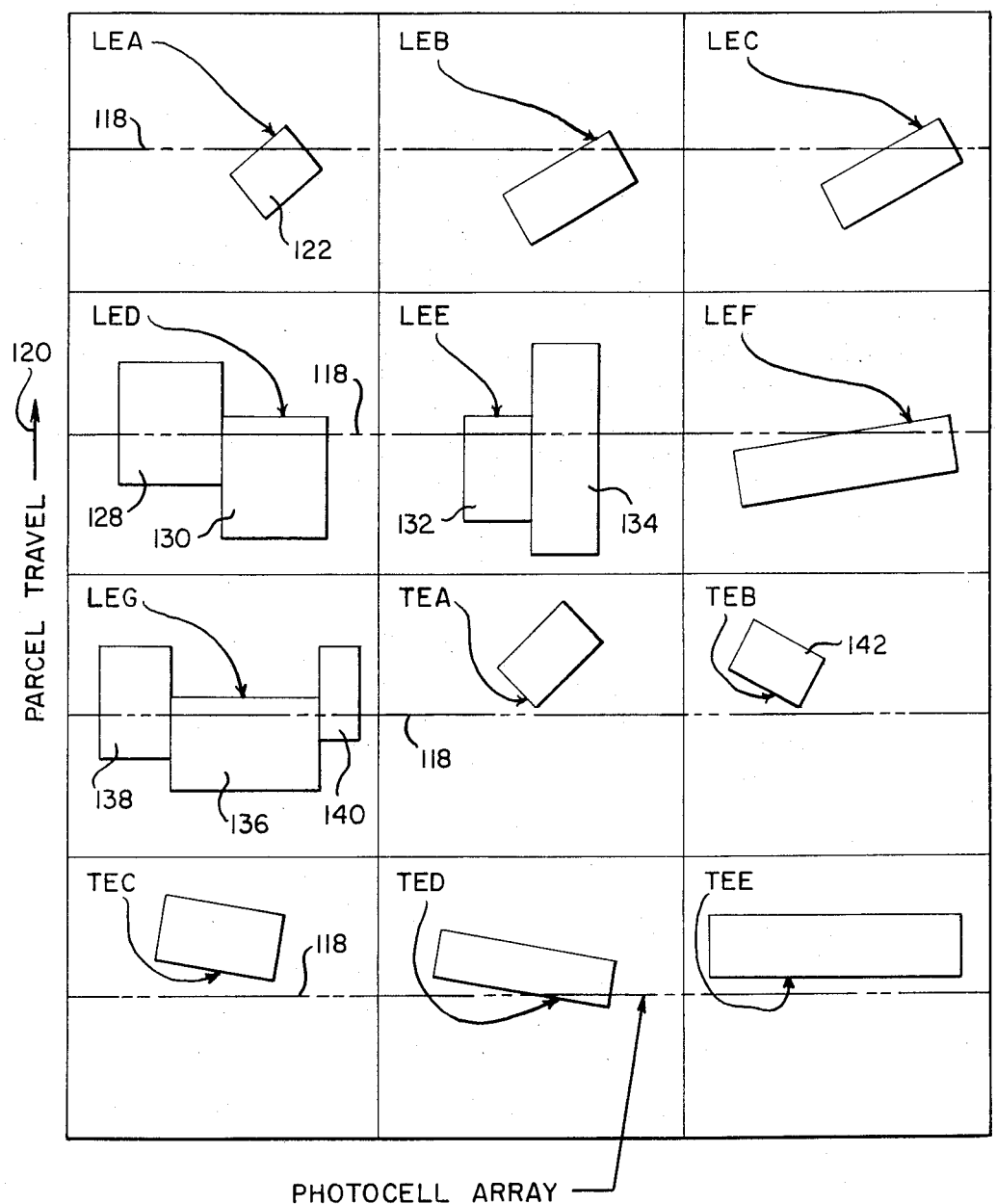
FIG. 2 is a chart showing typical parcel orientations with reference to the sampling line as they are moved by the conveyor means. The orientations correspond to the logic conditions shown in FIGS. 3 and 4, and show various Lead Edge and Trail Edge Events.

Typical parcel orientations when passing over the photocells 116 (FIG. 1) are shown in FIG. 2. Each enclosure like LEA, LEB, etc., represents a different parcel orientation by which a Lead Edge Event is recorded. Similarly, each enclosure like TEA, TEB, etc., represents a different parcel orientation by which a Trail Edge Event is recorded. Because the Lead Edge Events are relied upon to obtain a more accurate count, more orientations are shown for Lead Edge Events than for Trail Edge Events. Each enclosure shown in FIG. 2 has a sampling line which is represented by a dashed line 118, and the parcel travel for each enclosure is indicated by the arrow 120. Each enclosure has a Lead Edge or a Trail Edge marked by an arrow to identify the particular parcel orientation. The enclosure marked LEA shows a parcel 122 having a leading corner partially covering the sampling line 118; this orientation appears to be the most usual one and represents an LEA Event. The parcel orientations in the enclosures marked LEB, LEC, and LEF are generally similar to the orientation of the parcel 122 shown in the enclosure LEA, except that the angles of the parcels relative to the sampling line are such that the parcels approach the sampling line with one leading edge thereof progressively more parallel thereto. The enclosure marked LED shows two parcels 128 and 130 in contacting juxtaposed relation, with the parcel 130 (on the right side as viewed in FIG. 2) just crossing the sampling line. Similarly, two contacting parcels 132 and 134 in the enclosure LEE are shown with the parcel 132 (on the left side) just crossing the sampling line. The enclosure marked LEG shows the final parcel orientation for a lead Edge Event with a parcel 136 being sandwiched between parcels 138 and 140 as it approaches the sampling line 118.

Because the parcel orientations for Trail Edge Events (FIG. 2) are generally similar to the Lead Edge Events described in the previous paragraph, only Trail Edge Event TEB will be described in detail. The enclosure marked TEB shows a parcel 142, whose trailing corner has just left the sampling line 118. This parcel orientation seems to be typical. In view of the foregoing, the rest of the parcel orientations (TEA, TEC, TED, and TEE) shown in FIG. 2 appear to be self-explanatory.

Figure 8:
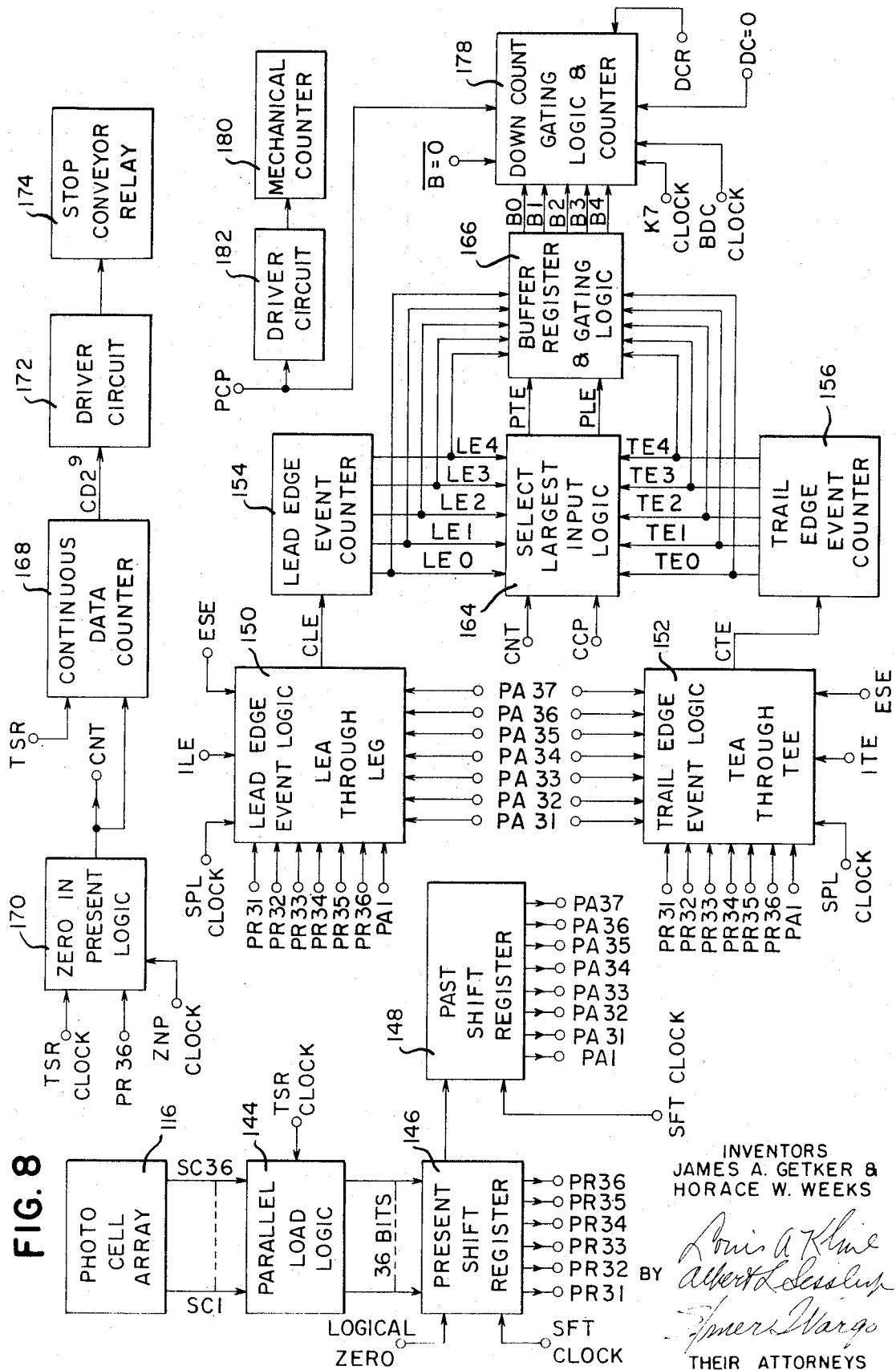
FIG. 8 is a block diagram of a circuit means employed in the counter.

Before proceeding with a discussion of the actual logic conditions defining a Lead Edge Event or a Trail Edge Event, it seems appropriate to discuss, partially, the logic circuitry of this invention. In the embodiment being described, there are 36 photocells 116 (FIG. 1) used to determine the sampling patterns as the parcels 100 move thereover. The output of these photocells 116 is fed as 36 bits of information to a parallel load logic circuit 144, shown in FIG. 8. Upon the occurrence of a transfer pulse (TSR, shown on the timing chart of FIG. 9), all of the data from the parallel load logic circuit 144 is parallel loaded into a 36 bit shift register means called the Present Shift Register 146. All of the circuits shown in block form in FIG. 8 are composed of conventional, logical, building blocks and, therefore, need not be described in detail. The logical equations for the various pulses utilized in the circuitry of FIG. 8 are defined later herein in a section entitled "Glossary of Terms".

After the data is transferred into the Present Shift Register 146 upon the occurrence of the transfer pulse TSR, it is serially shifted thereout into a 37-bit shift register means called the Past Shift Register 148. A shift pulse SFT (defined in the Glossary) is used to shift the data, and there are 36 such shift pulses per clock cycle, as shown on the Timing Chart of FIG. 9. Upon the occurrence of the first shift pulse (SFT1), all the data in the Present Shift Register 146 is shifted over one position (to the right, as viewed in FIG. 8), so that the data which was located in the thirty-sixth bit position of the Register 146 is shifted into the first position of the Past Shift Register 148. Upon each shift of data in the Present Shift Register 146, a logical "0" is placed in the first bit position (PR1) of the Register 146, so that, upon the thirty-sixth shift pulse (SFT36), the Present Shift Register is completely loaded with logical "0"s, and the 36 bits of data from the Present Shift Register are loaded into the first 36 bit positions of the Past Shift Register 148. The 36 bit positions of the Present Shift Register 146 are numbered PR1 through PR36 inclusive, and, similarly, the 37 bit positions of the Past Shift Register 148 are numbered PA1 through PA37 inclusive. The Past Shift Register 148 has a storage capacity of 37 bits, which is one more bit of data than the Present Shift Register 146 has, and the data shifted out of PA37 is not retained for further use.

The rate of sampling the condition of the photoelectric cells 116 (FIGS. 1 and 8) is dependent upon the variation in physical size of the parcels to be counted. To adjust to different sizes of parcels, the spacing between photocells may be varied along with the sampling rate. In the present embodiment, the clock logic for the circuit shown in FIG. 8 is reset every 15 milliseconds by a reset pulse RSC, shown on the timing chart in FIG. 9.

Selected data bit positions from the Present Shift Register 146 and from the Past Shift Register 148 are fed into comparison circuit means shown in FIG. 8. The last six data bit positions PR31 through PR36 of the Present Shift Register are fed into a Lead Edge Event Logic 150 and a Trail Edge Event Logic 152. The first data bit position PA1 and positions PA31 through PA37 inclusive of the Past Shift Register 148 are similarly fed into the Lead Edge Event Logic 150 and the Trail Edge Event Logic 152. Just prior to each shift pulse (SFT), a sampling pulse (SPL) occurs to initiate a comparison in the Lead Edge and the Trail Edge Event Logic. There are 36 such sampling pulses SPL1 through SPL36 inclusive (for each clock cycle) as defined in the Glossary. The data which is fed into the Lead Edge Event Logic 150 is examined by the Logic 150 upon the occurrence of a sampling pulse. When the logic conditions which define a Lead Edge Event are satisfied, a pulse representing a Lead Edge Event passes over the output (CLE) of the Lead Edge Event Logic 150 to a Lead Edge Event Counter 154, where the Lead Edge Events are counted.

Similarly, the same data which is fed into the Lead Edge Event Logic 150 (FIG. 8) is also fed into the Trail Edge Event Logic 152 and is examined upon the occurrence of a sampling pulse SPL. When the logic conditions which define a Trail Edge Event are satisfied, a pulse representing a Trail Edge Event passes over the output (CTE) of the Trail Edge Event Logic 152 to a Trail Edge Event Counter 156, where the Trail Edge Events are counted.

The sampling of the data from the Present Shift Register 146 and the Past Shift Register 148 occurs 36 times for each clock cycle by the sampling pulses SPL1 through SPL36 inclusive. After each sampling pulse, a shifting pulse SFT occurs, as shown on the timing chart of FIG. 9. As the data bits are continually shifted in the Present and Past Shift Registers, they are continually sampled in the Lead Edge Event Logic 150 and the Trail Edge Event Logic 152.

The particular logic conditions of selected positions of the Present and Past Shift Registers (146 and 148, respectively) used to define a Lead Edge Event are shown in FIG. 3. The logic equations used in conjunction with the Lead Edge Event Logic 150 of FIG. 8 are shown in FIG. 5. The Lead Edge Events LEA through LEG inclusive shown in FIGS. 3 and 5 correspond to the parcel positions shown in FIG. 2, already described.

The logic conditions shown in FIG. 3 are divided into two categories for each Lead Edge Event; namely, the Present Shift Register and the Past Shift Register. The various bit positions for each register are shown as a "0", a "1", or an "X". The "0" corresponds to no parcel at a photocell; the "1" corresponds to a parcel covering a photocell; and an "X" indicates that, for a particular Leading Edge Event, either a "1" or a "0" may exist in that particular bit position. For reasons to be described later, the first bit position PA1 of the Past Shift Register 148 is included with the data of the Present Shift Register 146 during the comparison of data in both registers at the Lead Edge Event Logic 150 and the Trail Edge Event Logic 152 of FIG. 8.

The logic conditions of the Present and Past Shift Registers 146 and 148 (for Lead Edge Events) shown in FIG. 3 are included in the logic equations for the Lead Edge Events shown in FIG. 5. These equations (which have not been simplified to any great degree) represent the complete logic equations by which the various Lead Edge Events are detected by the Lead Edge Event Logic 150 of FIG. 8. Because conventional logical building blocks may be used entirely in FIG. 8 for the various component circuits shown, no detailed logic circuits are shown for the logic equations.

The logic conditions for Trail Edge Events are similarly shown in FIG. 4, and the complete logic equations defining the various Trail Edge Events TEA through TEE inclusive are shown in FIG. 6.

Figure 7:
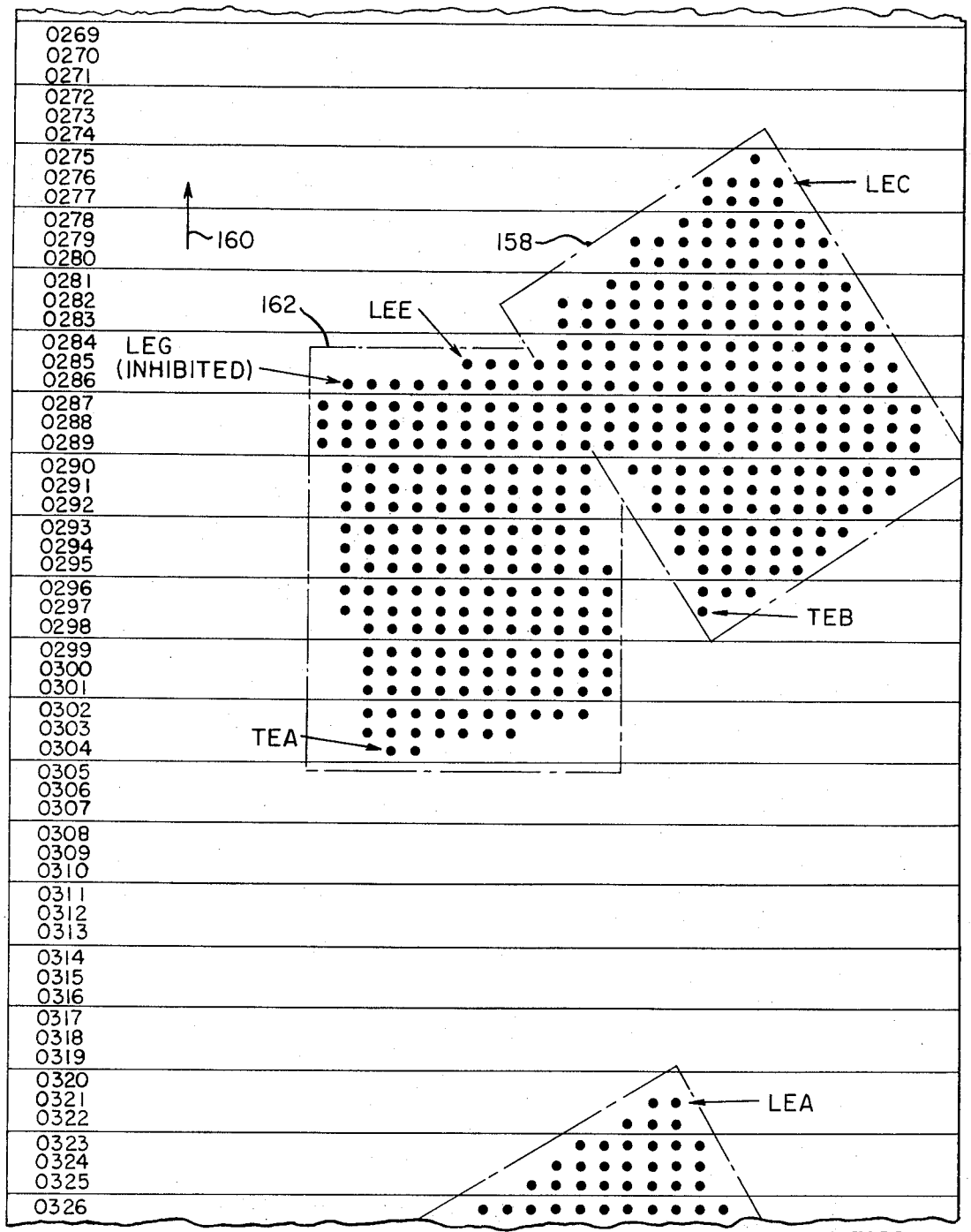
FIG. 7 is a print-out sheet showing a sampling pattern of blocked and unblocked photocells for several parcels passing over the sampling line and showing various Lead Edge and Trail Edge Events, the black dots on the sheet representing photoelectric cells covered by the passing parcels.

FIG. 7 is a print-out sheet which shows a sampling pattern of blocked and unblocked photocells for several parcels passing over the sampling line and also shows various Lead Edge and Trail Edge Events. The black dots on the sheet represent blocked photocells, or a "1" condition, as used herein, and, correspondingly, no mark indicates a "0". The numbers, like 0269 and 0270 appearing on the left side of the drawing, represent successive samplings at the sampling line. As an illustration, the collection of dots enclosed in the dashed line 158 represents a parcel which proceeded past the sampling line of photocells 116 (FIG. 1) while moving in the direction marked by the arrow 160. At a sampling marked 0274 (FIG. 7), there were no photocells which were blocked, and, at sampling 0275, one photocell was blocked. At the next sampling, 0276, four photocells were blocked. By the time the data representing the four blocked photocells (line 0276) is put into the Present Shift Register 146 (FIG. 8), the data representing the one blocked photocell (line 0275) is located in the Past Shift Register 148 as past data. When this data from both Present and Past Shift Registers is compared by the Lead Event Logic 150 (FIG. 8), a Lead Edge Event (of the LEC variety) will be recorded, and an output for a Lead Edge Event will pass to the Lead Edge Event Counter 154 over output CLE. It makes no difference where the parcel 158 is located on the conveyor when crossing the photocells 116, because the data from the photocells is continually shifted, and, after a sufficient number of shift (SPL) pulses, the binary "1"s representing the blocked photocells (from line 0276 in FIG. 7) will be shifted to positions PR33, PR34, PR35, and PR36 of the Present Shift Register (as shown in FIG. 3), and the binary "1" in the Past Shift Register (from line 0275 in FIG. 7) will be shifted into position PA35 to satisfy the logic equation LEC (shown in FIG. 5) and thereby record a Lead Edge Event. Generally, at least two blocked photocells are required to detect the presence of a Lead Edge Event. This requirement was made to minimize errors in counting due to a shadowing of photocells by, for example, the edges of two parcels which are closed to each other.

The detection of a second Lead Edge Event (LEE at lines 0284 and 0285) is also shown on FIG. 7. The LEE Event covers situations in which a parcel just crossing the sampling line is in contacting juxtaposition with a parcel on the right (as viewed in FIGS. 2 and 7); in FIG. 7, a parcel (represented by the enclosing dashed line 162) depicts such a situation. Note that one of the parcels (158, 162) is partially overlapping the other. At sampling 0284, no photocells were covered by the parcel 162, while, at the next sampling, 0285, four photocells were covered. These conditions produce a Lead Edge Event LEE, as shown in FIG. 3 and in FIG. 5.

Because of certain situations, it is necessary to inhibit certain Lead Edge Events in order to obtain a more accurate count. Using as an example the orientation of the parcels 158 and 162 (FIG. 7), just described in the previous paragraph, sampling 0286 shows five blocked photocells at the extreme left of the line, whereas these same five cells were unblocked in the previous sampling, 0285. The leftmost part of line 0286 and line 0285 represent a third Lead Edge Event (LEG), as shown in FIG. 3; however, because an LEE Lead Edge Event was detected at line 0285, the Lead Edge Event LEG at line 0286 is inhibited. As shown in FIG. 3, the LED, LEE, and LEG Events are inhibited by any Lead Edge Event which is detected in the preceding cycle. A fourth Lead Edge Event (LEA) is also recorded by the sampling of lines 0320 and 0321 shown in FIG. 7.

For Lead Edge Event detection, it is generally necessary that the data bits in the Present Shift Register be composed of at least two "1"s which are sandwiched between "0"s, as portrayed, for example, by the LEA and LEB Lead Events shown in FIG. 3. Because a parcel may sometimes ride on the extreme right edge of the sampling line 118 in FIG. 2, and because it is generally necessary to have the rightmost bit be a logical "0" in the Present Shift Register, the first bit position PA1 of the Past Shift Register is included as the rightmost digit of the Present Shift Register. Consequently, after the Present Shift Register is loaded, and during the first sampling (SPL1), PA1 is ignored by the lead Edge Event Logic 150 shown in FIG. 8. Such a requirement is not necessary for a parcel lying on the extreme left edge of the sampling line 118, which parcel would cover the leftmost photocell, marked SC1 in FIG. 8. At the first sampling, for example, the photocell SC1 (in addition to others) would be covered; however, after the first shift pulse SF1, a "0" would be put into the first position PR1 of the Present Shift Register as the data was shifted to the right. After successive shifts, the data in the Present Shift Register would satisfy the logic conditions like LEA, LEB, LEC, etc. (shown in FIG. 3), depending upon the number of photocells covered in addition to SC1.

The Trail Edge Events TEB and TEA are also shown in FIG. 7 to illustrate how a Trail Edge Event is detected. The sampling line 0296 contains three blocked cells (for the parcel 158), which become data stored in the Past Shift Register, and, at sampling line 0297, the data for only one blocked cell is shifted into the Present Shift Register (FIG. 4), enabling the Trail Edge Event Logic 152 (FIG. 8) to detect a TEB Trail Edge Event. An output (CTE) from the Logic 152 (FIG. 8) is shifted to the Trail Edge Event Counter 156, where one Trail Edge Event is counted. Similarly, at sampling line 0305 (FIG. 7), a TEA Trail Edge Event is also detected by the Logic 152 to record an additional Trail Edge Event Count in the counter 156. Because the sampling line 0305 (FIG. 7) contains no blocked cells (which in effect means a break in parcel flow), this feature is used to initiate a clearing of the Counters 154 and 156, as will be described later.

The Glossary of Terms alluded to earlier is listed below. The terms, where necessary, are logically defined.

GLOSSARY OF TERMS

CLOCK LOGIC

CC — Clock Oscillator Output - Period 50 $\mu$ sec

C1 — Clock Counter, Bit 1 (Least Significant)

C2 — Clock Counter, Bit 2

C3 — Clock Counter, Bit 3

C4 — Clock Counter, Bit 4

C5 — Clock Counter, Bit 5

C6 — Clock Counter, Bit 6

C7 — Clock Counter, Bit 7 (Most Significant)

CCP — Clock Oscillator Output, Delayed 10 $\mu$

RSC — Used to reset Clock Counter to Zero
RSC = $\overline{CCP} \cdot \overline{C1} \cdot \overline{C2} \cdot \overline{C3} \cdot \overline{C4} \cdot C5 \cdot \overline{C6} \cdot C7$ CCR — Clock Counter is Reset, CCR = $\overline{C1} \cdot \overline{C2} \cdot \overline{C3} \cdot \overline{C4} \cdot \overline{C5} \cdot \overline{C6} \cdot \overline{C7}$ SPL — Sample the Last seven bits of both Shift Registers to determine if a count event has occurred. There are 36 sample pulses for each clock cycle.
SPL = $\overline{CCP} \cdot C1 \, (\overline{C7} + \overline{C4} \cdot C7)$ SPL1 — The first of 36 SPL pulses during a clock cycle.

SPL32 — The 32nd of 36 SPL pulses during a clock cycle.

SPL33 — The 33rd of 36 SPL pulses during a clock cycle.

SPL34 — The 34th of 36 SPL pulses during a clock cycle.

SPL 35 — the 35th of 36 SPL pulses during a clock cycle.

SFT — Shift both Shift Registers one bit position to the right. Zero is shifted into position 1 of the Present Shift Register. There are 36 shift pulses per clock cycle.
SFT = $\overline{CCP} \cdot C1 \cdot \overline{CCR} [\overline{C7} + \overline{C4} \cdot C7 + C4 \cdot \overline{C2} \cdot \overline{C3} \cdot \overline{C5} \cdot C7]$ TSR — Parallel load thirty-six bits of information from the photocell array to the Present Shift Register.
TSR = $\overline{CCP} \cdot \overline{C1} \cdot C2 \cdot C3 \cdot C4 \cdot \overline{C5} \cdot \overline{C6} \cdot C7$ ZNP — Clock pulse decoded from the clock counter. Used to determine if the Present Shift Register contained all zeros during the previous cycle.
ZNP = $C1 \cdot \overline{C2} \cdot \overline{C3} \cdot C4 \cdot \overline{C5} \cdot \overline{C6} \cdot C7$ BDC — Clock counter decode used to transfer the contents of the Buffer to the Down Counter provided the Buffer contents are not zero and the Down Counter contains zero.
BDC = $C1 \cdot C2 \cdot \overline{C3} \cdot C4 \cdot \overline{C5} \cdot \overline{C6} \cdot C7$ K7 — Clock pulse to drive the mechanical counter.
K7 = ZNP·$\overline{K7}$, $\overline{K7}$ = ZNP·K7

SC1 through SC36 — 36 photocells used to detect the presence or absence of parcels in the counter. The condition of the cells is sampled every fifteen milliseconds.

PR1 through PR36 — Individual bits of the 36 bit Present Shift Register. This Register is parallel loaded by the TSR clock pulse. At each SFT pulse, the contents are shifted one position, and a zero is loaded into PR1.

ITO — Clear signals generated during initial machine turn-on used to reset the logic.

PA1 through PA37 — Individual bits of the 37 bit Past Shift Register. This Register is serial loaded by shifting bit PR36 into PA1. At each SFT pulse, the data shifted out of PA37 is lost.

CNT — Count. This signal is used to enable the "pass largest input logic" and reset the Continuous Data Counter. CNT becomes true when the ZNP clock pulse occurs, provided PR36 has contained all zeros during the previous shift cycle.

STOP CONVEYOR — Signal derived from the Continuous Data Counter which is used to stop the input conveyors if the CNT signal does not occur for approximately 7.5 seconds.

LEA through LEG — Lead Edge counting events.

ILE — Signal used to inhibit LED, LEE, and LEG events during the clock cycle following any other Lead Edge Event.

ESE — A signal used to enable the LED, LEE, and LEG events. ESE is made true by the occurrence of a zero in PR36 and at the TSR clock pulse. ESE is made false by the occurrence of LED or LEE or LEG.

TEA through TEE — Trail Edge counting events.

ITE — Signal used to inhibit all Trail Edge events during the clock cycle following the detection of a TEE event.

ESC — A signal used to enable the LEE event. ESC is made true by the occurrence of a zero in PA36 or by the TSR clock pulse. ESC is made false by the occurrence of the TEE event.

CLE — Count lead edge. This signal is formed by the logical OR of all Lead Edge Events.

LE0 through LE4 — Individual bits of the Lead Edge Event Counter. This Counter is advanced by one each time the the CLE signal occurs. The Counter is reset by either ITO or the CNT signal after the data is loaded into the Buffer Register.

CTE — Count Trail Edge. This signal is formed by the logical OR of all Trail Edge Events.

TE0 through TE4 — Individual bits of the Trail Edge Event Counter. This Counter is advanced by one each time the CTE signal occurs. The counter is reset by either ITO or the CNT signal after the data is loaded in the Buffer Register.

PLE — The contents of the Lead Edge Counter are greater than the contents of the Trail Edge Counter.
PLE = $\overline{CNT} \cdot \overline{CCP}$ (LE4·$\overline{TE4}$ + {LE4·TE4 + $\overline{LE4 \cdot TE4}$ }{LE3·$\overline{TE3}$ + [LE3·TE3 + $\overline{LE3 \cdot TE3}$] [LE2·$\overline{E2}$ + (LE2·TE2 + $\overline{LE2 \cdot TE2}$) (LE1·$\overline{TE1}$ + LE0·$\overline{TE0}$ (LE1·TE1 + $\overline{LE1}$ + $\overline{TE1}$) )]})

PTE — The contents of the Trail Edge Counter are greater than or equal to the contents of the Lead Edge Counter.
PTE = $\overline{CNT} \cdot \overline{CCP} \cdot \overline{PLE}$ B0 through B4 — Individual bits of the five-bit Buffer Register. The contents of the Lead Edge Event Counter are transferred to the Buffer Register by PLE. The contents of the Trail Edge Counter are transferred to the Buffer Register by PTE.

DC0 through DC4 — Individual bits of a Down Counter which is preset to a value and then counts down to zero. Each time this Counter is decremented by one, the mechanical parcel counter is advanced by one, and the PCP pulse is generated.

PCP — Parcel Count Pulse. This pulse is used to drive the mechanical counter and is used to an interface point with any other equipment.

TBD — A signal derived from the BDC clock pulse which is used to transfer the contents of the Buffer Register to the Down Counter.
TBD = BDC·DC = 0·$\overline{B}$ = $\overline{0}$ DC = 0. The contents of the Down Counter are all logical zeros.

DCR — Down Counter reset pulse.
DCR = ITO = DC0·DC1·DC2·DC3·DC4.

B = 0 — The contents of the Buffer Register are all logical zeros.

As stated earlier, when a particular sampling line (like line 0305 in FIG. 7) contains all logical "0"s or no blocked photocells, this fact is used to energize a conventional select circuit called Select Largest Input Logic 164 (FIG. 8). The purpose of the Logic 164 is to determine which of the counts present in the Lead Edge Event Counter 154 and the Trail Edge Event Counter 156 is the greater, and to transfer the greater of the two counts to a Buffer Register and Gating Logic 166. If the counts are equal, the Lead Edge Event count is used. The Logic 164 is energized by a count pulse CNT and a CCP pulse (both pulses being described in the Glossary). The Logic 164 produces a signal PLE, which enables the Gating Logic 166 to transfer the count from the Lead Edge Event Counter 154 to the Buffer Register when the Lead Edge count is greater than the Trail Edge Count. Similarly, a signal PTE enables the Gating Logic to transfer the Trail Edge Count to the Buffer Register when the Trail Edge Count is the greater.

In order to initiate the count pulse (CNT) and to insure that the parcel counter is working properly so as to prevent the conveyors like 108, 106 (FIG. 1) from running when no break occurs in the parcel flow over the photocells 116 for a predetermined time, a Continuous Data Counter 168 (FIG. 8) and related circuitry are used. The TSR pulse which transfers the 36 bits of data from the photocells 116 to the Present Shift Register 146 is also fed into the Counter 168, which is a conventional binary counter, and into a circuit called a Zero in Present Logic 170 (FIG. 8). The Logic 170 includes a flip-flop and logical gates to determine whether or not all "0"s were present in the Present Shift Register for a previous cycle. The bit PR36 is fed into the Logic 170 for this purpose. If all "0"s were present, it means that no parcel is covering the photocells; this feature is used to generate a CNT pulse (as defined in the Glossary) which is fed into the Select Largest Input Logic 164 and is used to reset the Continuous Data Counter 168. As stated earlier, when parcels move past the photocells 116 in overlapping relationship, the data about the parcels (Lead Edge and Trail Edge Events) is stored in the respective Counters 154, 156, respectively, until a break in the flow of parcels occurs. When a break occurs, the count pulse CNT is produced to initiate the counting of the events.

The Zero in Present Logic 170 (FIG. 8) is also used to prevent the conveyors (FIG. 1) from running when no break occurs in parcel flow over the photocells 116 for a predetermined amount of time. The TSR pulse (which transfers data from the photocells to the Present Shift Register 146) is fed into the Logic 170 and the Continuous Data Counter 168. If there are "1"s being fed continually into the Zero In Present Logic 170 via PR36, it means that there are parcels flowing over the photocells 116 (or perhaps foreign matter like a scrap of paper is continually covering one or more photocells). Consequently, the TSR pulses will be continually counted in the Continuous Data Counter 168, which is not reset until the occurrence of all "0"s in PR36. If there is no occurrence of a situation of all "0"s in PR36 within $2^9$ TSR pulses, the capacity of the Counter 168 is reached, and a stop conveyor signal is produced. The stop conveyor signal is fed into a conventional Driver Circuit 172, which energizes a relay 174 to stop the conveyors 102, 104, and 106. The conveyor 108 is permitted to run to discharge any parcels thereon to provide a break in parcel flow, which produces the count CNT signal.

The circuitry for the Lead Edge Event Logic 150 and the Trail Edge Event Logic 152 (FIG. 8) is composed of conventional logical building blocks according to the equations shown in FIGS. 5 and 6, respectively; however, there are certain situations which require additional explanation. As stated earlier, certain of the Lead Edge Events are inhibited under particular conditions defined in FIG. 3. Two signals, ILE and ESE, defined in the Glossary, are fed into the Lead Edge Event Logic 150 shown in FIG. 8. These signals are included in the logic equations shown in FIG. 5. Similarly, ITE and ESC signals, defined in the Glossary, are fed into the Trail Edge Event Logic 152, shown in FIG. 8, and are included in the logic equations shown in FIG. 6.

Whenever a Lead Edge Event (which is not inhibited) occurs, a pulse CLE passes to the Lead Edge Event Counter 154. The Counter 154 is a conventional five-bit binary counter with outputs designated LE0, LE1, LE2, LE3, and LE4, which outputs are also connected to be fed into the Select Largest Input Logic 164 and the Buffer Register 166. Similarly, whenever a Trail Edge Event (which is not inhibited) occurs, a pulse CTE passes to the Trail Edge Event Counter 156. The Counter 156 is a conventional five-bit binary counter with outputs designated TE0, TE1, TE2, TE3, and TE4, which outputs are also connected to be fed into the Buffer Register and Gating Logic 166.

The Select Largest Input Logic 164 (FIG. 8) employs conventional logical circuitry to determine which of the counts from the Lead Edge Event Counter 154 or the Trail Edge Event Counter 156 is the greater. When the count in the Lead Edge Event Counter 154 is greater, a signal PLE passes from the Logic 164 to the Buffer Register and Gating Logic 166. The signal PLE is defined by the logical equation appearing in the Glossary. When the count in the Trail Edge Event Counter 156 is greater, a signal PTE passes from the Logic 164 to the Buffer Register and Gating Logic 166. The signal PTE is defined by the logical equation appearing in the Glossary. Upon the occurrence of the PLE signal, the count stored in the Lead Edge Event Counter is transferred to the Buffer Register and Gating Logic 166, and, similarly, upon the occurrence of the PTE signal, the count stored in the Trail Edge Event Counter 156 is transferred to the Logic 166. IF the counts from the Counters 154 and 156 are equal, the count from the Lead Edge Event Counter 154 is used.

The output of the Buffer Register and Gating Logic 166 is transferred to a Down Count Gating Logic and Counter 178 by the outputs B0, B1, B3, and B4 (FIG. 8). This output represents the binary count of Lead Edge Events or Trail Edge Events, whichever is greater, as previously explained. The general purpose of the Counter 178 is to feed the count to a mechanical counter 180 at a rate slow enough to be compatible therewith. A BDC pulse and its associated TBD pulse (both being defined in the Glossary and shown on the Timing Chart of FIG. 9) are used to transfer the contents of the Buffer Register and Gating Logic 166 to conventional binary counters (flip-flops) in the Down Count Gating Logic and Counter 178, provided that the count in the Buffer Register 166 is not zero ($\bar{b}=0$, as shown in FIG. 8), and the contents of the Down Counter 178 are all logical zeros ($D=0$) for the following reasons. If the count in the Buffer Register 166 is zero, there is no need to transfer data to the Down Counter 178, and, if the Down Counter 178 is not at zero prior to the transference of data thereto, errors in the Count will occur. Assume that the conditions for loading the "Down Counter" 178 are satisfied and the Counter 178 is loaded with data from the Buffer Register 166. The circuit entitled Down Count Gating Logic and Counter 178 includes five conventional binary counters, which are preset to the values DC0, DC1, DC2, DC3, and DC4, which correspond to the bits B0 through B4, respectively, from the Buffer Register and Gating Logic 166. Upon each occurrence of a clock pulse K7 (defined in the Glossary), the count in the Down Counter 178 is decremented by one, and a parcel count pulse (PCP) is generated as an output from the Down Counter 178. A conventional Driver Circuit 182 receives the parcel count pulse PCP and uses it to drive the mechanical counter 180, upon which the parcel count is recorded. The parcel count pulse PCP is also fed to a central control unit (not a part of this invention and not shown), which monitors the output and the performance of individual handling units, as previously explained. Each time the K7 pulse occurs, the Down Counter 178 is decremented by one, and, when the count therein reaches zero, a signal ($DC=0$) is produced and is used to stop any further decrementing of the Down Counter 178, which is left at zero. A reset pulse (DCR, shown in FIG. 8) is generated when the binary counters in the Down Counter 178 all become "1"s, and the reset pulse is used to reset the binary counters in the Down Counter 178. The resetting of the Down Counter 178 when "1"s are sensed is a safety feature to insure against decrementing the Counter 178 through zero. With type of Down Counter 178 used, an extra decrementing pulse to the Counter, after the Counter has already reached zero, will cause the bits of the Counter to be set to "1"s. In the embodiment described, a count capacity of 31 for the Down Counter 178 was adequate, as the count in the Lead Edge Counter 154 or the Trail Edge Counter 156 rarely exceeds 31 without an interruption of parcel flow which initiates the counting as previously explained. Throughout the circuitry shown in FIG. 8, a conventional "initial turn on" ITO signal (not shown) is used during initial warming-up of the counter to reset all flip-flops used in the circuitry.

What is claimed is:

1. A counter for counting objects having lead edges and trail edges comprising:
    a plurality of individual detector means to provide a sampling line;
    conveyor means for moving said objects towards said sampling line to form a plurality of sampling patterns in said detector means as said objects are moved over said sampling line;
    comparison means, including logic circuit means designed according to a predetermined set of logic equations, for successively comparing each said sampling patter with an immediately prior sampling pattern enabling said logic circuit means to detect the lead edges of said objects as defined by said equations as said lead edges pass over said sampling line;
    counting means including a lead edge counter for registering a count of said lead edges;
    said comparison means further including:
        a present shift register means for storing therein a sampling pattern received from said detector means at said sampling line;
        a past shift register means for storing therein a sampling pattern which is transferred thereto from said present shift register means so as to represent an immediately prior sampling pattern compared to the sampling pattern in said present shift register means; and
    clock means for producing transfer pulses, shift pulses, and sampling pulses;
        each said transfer pulse being effective to periodically transfer a said sampling pattern from said detector means to said present shift register means;
        each of said sampling pulses being used to periodically energize said logic circuit means to compare the sampling pattern in said past shift register means with the immediately prior sampling pattern in said present shift register means; and
        each said shift pulse being used to shift the sampling pattern in said present and past shift register means one bit position in the same direction, there being a fixed number of sampling and shift pulses between successive transfer pulses.

2. The counter as claimed in claim 1 in which each said detector means is a photoelectric cell having a common energizing light located above said sampling line and directed towards said cells,
    said sampling pattern being made up of binary ones and binary zeros, with the binary zeros representing cells energized by said common light and the binary ones representing cells having the light thereto blocked by an object passing over said sampling line;
    said counter further including a continuous data counter means for counting said transfer pulses and for stopping said conveyor means after a fixed number of successive sampling patterns in which at least one binary one occurs in each of said fixed number of successive sampling patterns, thereby providing a check on an improperly operating counter.

3. The counter as claimed in claim 1 in which said comparison means further includes a second logic circuit means designed according to a predetermined second set of logic equations, for successively comparing each said sampling pattern with an immediately prior sampling pattern enabling said second logic circuit means to detect the trail edges of said objects as defined by said second set of logic equations as said trail edges pass over said sampling line; and said counting means including a trail edge counter for registering a count of said trail edges.

4. The counter as claimed in claim 3 in which said counting means further includes:
   a buffer register means; and
   a select circuit means for comparing the counts in the lead edge counter and the trail edge counter and for selecting the greater of the counts as representative of the objects passing over the sampling line, and for transferring the greater of the counts to said buffer register means.

5. The counter as claimed in claim 4 in which said counting means further includes:
   a mechanical counter; and
   a down counter means for receiving the count from said buffer register means and transferring it to said mechanical counter at a speed compatible therewith.

* * * * *

UNITED STATES PATENT OFFICE
CERTIFICATE OF CORRECTION

Patent No. 3,692,980          Dated  September 19, 1972

Inventor(s)  James A. Getker & Horace W. Weeks

It is certified that error appears in the above-identified patent and that said Letters Patent are hereby corrected as shown below:

Column 7, line 60, delete "closed" and substitute "close".

Column 10, line 51, delete " $[LE2 \cdot \overline{E2}$" and substitute " $[LE2 \cdot \overline{TE2}$".

Column 11, line 2, delete "to" and substitute "as".

Column 11, line 11, delete "=" (second occurrence) and substitute "+".

Column 14, line 12, delete "patter" and substitute "pattern".

Signed and sealed this 20th day of February 1973.

(SEAL)
Attest:

EDWARD M. FLETCHER, JR.
Attesting Officer

ROBERT GOTTSCHALK
Commissioner of Patents